United States Patent Office 2,909,571
Patented Oct. 20, 1959

2,909,571

PURIFICATION OF FLUORINE CONTAINING OLEFIN MONOMERS

Billy F. Landrum, Cedar Grove, N.J., and Karl-Heinz Kahrs, Heinrich Kuhn, and Rudolf Schaff, Frankfurt am Main, Germany, assignors, by mesne assignments, to Minnesota Mining and Manufacturing Company, St. Paul, Minn., a corporation of Delaware No Drawing. Application July 11, 1956
Serial No. 597,301

Claims priority, application Germany July 26, 1955

5 Claims. (Cl. 260—653.5)

This invention relates to the dehalogenation of a halogen-containing compound. In one of its aspects this invention relates to the purification of halogen-containing olefins. In another of its aspects this invention relates to a process for preparing and purifying fluorine-containing olefins. In still another of its aspects, this invention relates to the production of polymers from halogen-containing olefinic monomers which polymers have improved physical characteristics which result from the purification of monomer.

Intermediate compounds of significant industrial importance are prepared by dehalogenation reactions. For example, polymers of trifluorochloroethylene are prepared by polymerizing monomeric trifluorochloroethylene which is usually obtained by the dechlorination of trifluorotrichloroethane in an alcohol media using a metallic dehalogenating agent, such as zinc. The polymers of the chlorofluoroolefins, such as trifluorochloroethylene, possess many and varied desirable properties resulting in a high degree of utility which is due to their chemical stability and physical characteristics. The polymerization of the chlorofluoroolefins to form high molecular weight polymers, i.e., normally solid or plastic polymers provides a material which can be fabricated into many useful articles. Because of the fabricability of the plastic or solid polymer, and because of the superior physical characteristics of the chlorofluoroolefin polymers, many ordinary and specialized items may be produced which will find diversified industrial use. Typical of these, are chemically resistant valve seats, plugs, gaskets, etc., bottles and specialized containers and other additional materials where the advantages of non-inflammability, high strength, clarity and chemical resistance may be exploited.

In conducting the polymerization reaction it is important that the monomer be substantially free of contaminants since otherwise the quality of the product will be adversely affected. For example, halogenated olefinic monomers, such as trifluorochloroethylene, can be prepared by dehalogenation of a suitable starting material in an alcoholic medium using a metal dehalogenating agent, such as zinc. During the dehalogenation reaction, a number of side reactions occur which result in the contamination of the desired monomer with trace quantities of impurities. Because of the high cost of the alcohol, it is preferred to recycle alcohol to the dehalogenation zone. However, recycling of the alcohol tends to increase the concentration of impurities in the monomer.

It is an object of this invention to provide a process for purifying halogenated olefinic monomers.

It is another object of this invention to provide a purification process which will permit the recycling or reuse of alcohol in dehalogenation reactions.

It is another object of this invention to produce polymers of the halogenated olefinic monomers having superior physical properties, such as clarity, ZST, heat resistance, etc.

Various other objects and advantages of the present invention will become apparent to those skilled in the art on reading the accompanying description and disclosure.

The above objects are accomplished by admixing the monomer with sulfuric acid thereby purifying the monomer, recovering the monomer from the monomer-sulfuric acid mixture and polymerizing the monomer to produce a solid thermoplastic polymer of superior physical and chemical characteristics. The monomer can be in vapor or liquid phase when it is admixed with the sulfuric acid.

As indicated previously, many of the starting materials which are purified by the process of this invention are prepared by the dehalogenation of aliphatic compounds in a solvent using a metal dehalogenating agent. These aliphatic compounds contain at least one chlorine atom on each of two adjacent carbon atoms and at least one fluorine atom. The adjacent carbon atoms of the aliphatic carbon chain, preferably an alkane chain, can be additionally bonded to alkyl, aryl halogen or hydrogen substituents. In the case of straight chain compounds, preferably not more than 6 carbon atoms constitute the chain. These starting compounds can be unsaturated provided that no unsaturation is present between the adjacent carbon atoms which contain the removable halogens. This invention is particularly suited to the purification of monomers obtained by the dehalogenation of fluorochloroalkanes. Preferred starting compounds are those which contain from 2 to 3 carbon atoms.

This invention particularly contemplates the purification of monomers, such as trifluorochloroethylene, tetrafluoroethylene, vinylidene fluoride, symmetrical and unsymmetrical dichlorodifluoroethylene, perfluoropropene, 2,3,3,3-tetrafluoropropene, 3,3,3-trifluoropropene, 2-chloro-3,3,3-trifluoropropene, etc.

As will become apparent hereinbelow, this invention is of particular applicability to the purification of monomer produced by dehalogenation of a starting compound with a metal dehalogenation agent in a solvent. In this type of reaction, the starting material, which is an aliphatic carbon compound as defined above, is dehalogenated in a suitable solvent in the presence of a metallic dehalogenating agent to produce the corresponding olefin. Suitable solvents or diluents for the dehalogenation reaction, comprise the water-soluble alcohols, such as methyl, ethyl, n-propyl, and n-butyl alcohol; dioxane, glycerol, butyl carbitol, and the Cellosolves. The preferred solvents are methyl and ethyl alcohol. The metal dehalogenating agents which are used in the process of this invention, are tin, magnesium, iron, zinc and aluminum. Zinc is a preferred dehalogenating agent. The crude monomer effluent containing relatively high and low boiling contaminants is removed from the dechlorination reactor and purified. The major contaminants of the crude monomer are the solvents, such as methyl alcohol, which are water-soluble, and various other haloolefins and haloparaffins which are water-insoluble. Additionally, where recycle alcohol is used, ethers corresponding to the alcohol solvent are found, e.g., where methyl alcohol is used dimethyl ether is found as an impurity. In one mode of operation of the process of this invention, the crude monomer can be water-washed to effectively remove water-soluble impurities. After water-washing, the water-washed monomer is then dried under conditions, such that the monomer contains usually less than 100 parts per million and preferably less than 10 parts per million of water. The inclusion of a water-washing step is desirable because it tends to conserve the sulfuric acid.

After the water-washing step, if a water-washing step is used, the crude monomer is admixed or contacted with sulfuric acid. The concentration of the sulfuric acid can vary over relatively wide limits. However, the purification efficiency depends on the concentration of the sulfuric acid. Thus, the more highly concentrated the acid the more efficient the purification step. Sulfuric acid containing free $SO_3$ tends to react with the monomer and hence, should not be employed. Therefore, the concentration of sulfuric acid should be maintained between 10 percent and 98 percent, preferably above 90 percent. The sulfuric acid wash can be carried out according to various methods. For example, after the dehalogenation, monomer in liquid or vapor phase is admixed with sulfuric acid. Thus, the monomer in liquid phase, preferably as finely-divided droplets, can be introduced into the bottom of a column of sulfuric acid (density above 1.5) maintained at a temperature below the critical temperature of the monomer and at a pressure sufficient to maintain monomer in liquid phase and be withdrawn from the top thereof. The monomer can also be introduced into the bottom of a column of sulfuric acid in liquid phase and be withdrawn from the top thereof in vapor phase. Preferably, the monomer is admixed with the sulfuric acid in vapor phase in which case it can be passed through suitable gas scrubbing equipment such as a spray tower in which the sulfuric acid is sprayed countercurrent to the gas stream. The dispersion of the sulfuric acid therein, can be effected by trays or by spray nozzles.

An important feature of this invention resides in the use of sulfuric acid as a means for improving polymers of the halogenated olefins and particularly the perfluorochloroolefins. Prior to this invention, in some instances, difficulty was experienced in producing the high molecular weight polymers. This was believed due to the presence of various impurities in the monomer which could not be removed by an established purification process. It was discovered that, when the monomer was contacted with sulfuric acid, improved polymers were obtained. Sulfuric acid is believed to act as a scavenger and picks up trace impurities remaining in the monomer. These impurities are usually obtained during the dehalogenation reaction as well as the various recycle operations. They are usually of the $COX_2$ type, where X is equivalent to a halogen or a halogenated carbon atom or atoms or to hydrogen or hydroxyl groupings; phosgene, trichloroacetyl chloride, and trichloroacetic acid are illustrative. Where recycle alcohol is used, methyl ether is also present as an impurity.

It is within the scope of this invention to contact the fluorine-containing olefin with sulfuric acid at any point prior to the polymerization of the olefin. Thus, as indicated previously, if a water-washing step is employed, the sulfuric acid wash may be carried out prior to or after the water-washing step, although preferably the sulfuric acid wash is carried out after the water-washing step in order to conserve the sulfuric acid. Where the monomer is to be purified by distillation, e.g., a first distillation to remove low boiling impurities and a second distillation to remove high boiling impurities, the sulfuric acid wash can be carried out prior to or after the distillation step.

According to this invention, the fluorine-containing olefin is contacted with sulfuric acid at a temperature preferably above 20° C. and, where the operation is in liquid phase, below the critical temperature of the fluorinated olefin which in the case of trifluorochloroethylene is about 109° C. In vapor phase operations, the temperature, of course, can be as high as 100° C. although no particular advantage accrues from the use of such high temperature. Preferably, the fluorine-containing olefin is maintained in liquid or vapor phase by adjustment of pressure. For example, pressures between about 75 and about 220 pounds per square inch gage are sufficient to maintain trifluorochloroethlene in liquid phase. The fluorine-containing olefin is removed from the sulfuric acid by distillation.

For a better understanding of the present invention, the process will be described in terms of the polymerization of trifluorochloroethylene to produce the homopolymers thereof. It will be understood that the conditions referred to are for purposes of illustration and may be varied without departing from the scope of the invention. It is also to be understood that the process can be applied to the polymerization of other haloolefinic monomers including copolymerization systems and that this illustration is not limiting. In accordance with the illustrative process, trichlorotrifluoroethane of the 1,2,2, chloro structure, which can be obtained commercially on the open market as Freon 113, is continuously passed to a dehalogenator in which it is dehalogenated with zinc dust. The dehalogenation reaction is carried out in the presence of recycle methyl alcohol as solvent. The dehalogenation process is described in U.S. Patent 2,600,804, issued June 17, 1952 to J. S. Rearick.

It has been discovered as stated above, that contacting the fluorine-containing olefin with sulfuric acid and subsequently recovering the olefin from the acid prior to polymerization, results in the production of polymers having superior characteristics than those polymers produced from monomers not so treated. In the preferred method of operation, the monomer is first distillated and passed in vapor phase through the sulfuric acid. In this first fractional distillation, a bottom temperature between about 30 and about 60° C. is maintained. The low boiling impurities are removed from the distillation column as a vapor and condensed for possible subsequent recovery. The fluorine-containing olefin is then subjected to a second distillation to remove high boiling impurities. In this second distillation, the olefin is removed overhead from the distillation column as vapor and is condensed and accumulated. Bottom temperature of the second distillation column is maintained between about 30° C. and about 60° C. with a top temperature of about 43° C. to about 49° C. The olefin after passing through the sulfuric acid wash is condensed for subsequent introduction into a polymerization zone.

Polymerization of the fluorine-containing olefin monomer obtained from the above distillation and sulfuric acid treatment, is effected under suitable conditions with or without the presence of a suitable promoter material. Thus, the polymer can be polymerized using the bulk technique described in U.S. Patent No. 2,579,437, issued December 18, 1951, to W. T. Miller; by the slurry technique described in U.S. Patent No. 2,600,804, issued June 17, 1952, to J. S. Rearick, and by the aqueous redox system described in U.S. Patent No. 2,689,241, issued September 14, 1954, to A. L. Dittman, H. J. Passino and J. W. Wrightson. The polymerization can also be carried out in water by an emulsion technique. In the emulsion technique, emulsifying agents are required. These emulsifying agents are fluorinated organic compounds which do not adversely affect the polymerization reaction, as contrasted with alcohols and ketones which do. These fluorinated organic compounds are the fluorinated acids and the salts of the acids which are prepared by the oxidation of the perhalogenated aliphatic olefins containing at least 7 carbon atoms. These fluorinated compounds have the formula $B(CF_2)_n(CH_2)_mA$, in which B is hydrogen or fluorine, n is an integer at least equal to 5, m is 0 or 1, the sum of $m+n$ is at least equal to 6 and A is an ionic hydrophilic group. Compounds of this type are disclosed in U.S. Patent 2,559,752. The salts of these perfluoroolefins, include the alkali metal, ammonium and substituted ammonium salts. Other fluorinated acids are the acids derived from perfluorochloroolefin telomers, such as telomers of trifluorochloroethylene. The telomerization of trifluorochloroethylene is usually carried out using a sulfuryl halide as the telogen. The reaction occurs essentially as shown below using sulfuryl chloride.

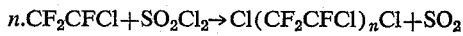

$n.CF_2CFCl + SO_2Cl_2 \rightarrow Cl(CF_2CFCl)_nCl + SO_2$ in which n is an integer from 2 to about 20. The resulting product is fractionated into cuts which represent individual compounds. Hydrolysis of these compounds using sulfuric acid yields the corresponding monocarboxylic acids which on neutralization with alkali hydroxides and ammonium hydroxide to a phenolphthalein end product yield the corresponding alkali metal or ammonium salts. In the polymerization reaction, the preferred emulsifiers are the perfluorochloroolefin telomer acids and the salts thereof. When employed, emulsifying agents are usually used in a weight ratio of from about 0.1 to about 30 parts per 100 parts of total monomer initially present in the polymerization zone and are preferably employed in a ratio of 1.5 to 10 parts by weight per 100 parts of total monomer initially present. In the emulsion polymerization system a promoter is used. Such promoters comprise the inorganic peroxides. Examples of suitable inorganic peroxides are the water-soluble peroxides, such as the perborates, persulfates, perphosphates, percarbonates, barium peroxide, zinc peroxide, and hydrogen peroxide. Particularly valuable are the water-soluble salts of the peracids, such as sodium, potassium, calcium, barium, and ammonium salts of persulfuric and perphosphoric acids which may be prepared in the conventional manner by electrolytic oxidation of salts of the corresponding oxy acids. Suitable concentration of the promoter lies within the range of 0.003 molar to about 0.1 molar.

The temperature employed in the emulsion polymerization will depend to a certain extent upon the particular monomer being polymerized. While the temperature may be varied depending upon the type of monomer, it is preferred that the temperature be maintained below about 100° C. Temperatures below about 0° C. can not be used. In the polymerization of trifluorochloroethylene, temperatures between about 10° C. and about 30° C. are preferred. Still more preferable, are temperatures between about 15° C. and about 25° C. while a particularly suitable temperature is about 20° C. for the production of high N.S.T. polymers of trifluorochloroethylene, i.e., polymers having an N.S.T. of above about 320° C.

The time of polymerization also depends upon the monomer being polymerized, but in general, times between about 10 minutes and about 72 hours may be employed. A preferred polymerization time is between about 20 and about 50 hours. Generally, the polymerization time will not exceed 96 hours.

In the table below additional data are presented which clearly indicate the distinction between polymers prepared from purified, sulfuric acid treated monomer, and polymers prepared from purified but not sulfuric acid treated monomer. The monomer was prepared by dechlorinating trifluorotrichloroethane with metallic zinc using recycle alcohol as described above. In connection with the monomer, it is surprising to note that monomer purified by distillation over silica gel exhibits a strong absorption band at 3.45 microns in the infrared region (indicating the presence of dimethyl ether). Polymerization of monomer having an absorption of 3.45 microns in the infrared region yields a polymer of low specific viscosity and ZST. The presence of this impurity markedly decreases the rate of polymerization and depresses the specific viscosity and the ZST even when the impurity is present in very small amounts. Monomer which has been sulfuric acid treated, exhibits no absorption band at 3.45 microns and polymerizes to produce a high molecular weight polymer. As may be seen from the attached table, a polymer having approximately twice the specific viscosity as well as more than twice the ZST, i.e., having practically twice the molecular weight, is obtained under otherwise equivalent experimental conditions from a chlorotrifluoroethylene purified with sulfuric acid in comparison to that obtained from the same monomer purified with silica gel. In each of the purification processes the monomer was flash-distilled through an absorption column containing silica gel or sulfuric acid as indicated in the table. The polymerization process was carried out in an emulsion system activated with $K_2S_2O_8$ and maintained at a pH of 8. The emulsifying agent was the potassium salt of $Cl(CF_2CFCl)_3CF_2COOH$. The polymerization recipe was as follows:

| | | |
|---|---|---|
| Trifluorochloroethylene | kg | 10 |
| Water | kg | 50 |
| $K_2S_2O_8$ | kg | 0.24 |
| $Cl(CF_2CFCl)_3CF_2COOH$ | kg | 0.45 |
| $Na_2HPO_4 \cdot 2H_2O$ | kg | 0.48 |
| KOH | mol | 0.95 |

The polymerization temperature was 25° C. in each instance and the polymerization time was 20 hours.

TABLE 1

*Polymerization of $CF_2$=CFCl with various purified monomers*

| Purification method of $CF_2$=CFCl | Conversion, Percent | Specific viscosity [1] | ZST, sec. |
|---|---|---|---|
| Silica gel | 37 | 1.39 | 200 |
| Do | 38.5 | 1.52 | 221 |
| Sulfuric acid | 52 | 2.43 | 497 |
| Do | 59 | 2.66 | 553 |

[1] The specific viscosity was determined in a 1% solution in 2,5-dichlorobenzotrifluoride at 130° C.

Various alterations and modifications of the invention and its aspects may become apparent to those skilled in the art without departing from the scope of this invention.

Having thus described the invention, we claim:

1. A process which comprises in a dechlorination step dechlorinating an aliphatic compound containing at least one chlorine atom on each of two adjacent carbon atoms and at least one fluorine atom in the presence of a metal dechlorinating agent and a water soluble alcohol as a solvent to produce a fluorine containing olefin contaminated with a compound of the type of $COX_2$ in which X is selected from the group consisting of a halogen, a halogenated carbon atom, halogenated carbon atoms, hydrogen and hydroxyl radical, separating the olefin containing said $COX_2$ compound from the dechlorination step, thereafter admixing the olefin containing said $COX_2$ compound with sulfuric acid of 10 to 98 percent concentration and recovering purified fluorine-containing olefin substantially free from said $COX_2$ compound.

2. The process of claim 1 in which said aliphatic compound is trifluorotrichloroethane and said olefin is trifluorochloroethylene.

3. The process of claim 1 in which said olefin when contacted with sulfuric acid is in the liquid phase.

4. The process of claim 1 in which said olefin when contacted with sulfuric acid is in the vapor phase.

5. The process of claim 1 in which the concentration of sulfuric acid is above 90 percent.

References Cited in the file of this patent

UNITED STATES PATENTS

| | | |
|---|---|---|
| 1,440,976 | Ellis et al. | Jan. 2, 1923 |
| 2,005,705 | Daudt et al. | June 18, 1935 |
| 2,178,695 | Muskat et al. | Nov. 7, 1939 |
| 2,266,177 | Dosser et al. | Dec. 16, 1941 |
| 2,590,433 | Blum | Mar. 25, 1952 |
| 2,637,748 | Miller | May 5, 1953 |
| 2,754,336 | Chernosky et al. | July 10, 1956 |

OTHER REFERENCES

Tarrant: Jour. Am. Chem. Soc., vol. 76, No. 6, Mar. 20, 1954, pages 1624 and 1625.